United States Patent
Okutsu

(10) Patent No.: US 9,268,726 B2
(45) Date of Patent: Feb. 23, 2016

(54) INFORMATION PROCESSING APPARATUS, CONTROL METHOD THEREOF, AND STORAGE MEDIUM

(75) Inventor: Toshihisa Okutsu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 287 days.

(21) Appl. No.: 13/124,477

(22) PCT Filed: Feb. 10, 2010

(86) PCT No.: PCT/JP2010/052391
§ 371 (c)(1),
(2), (4) Date: Apr. 15, 2011

(87) PCT Pub. No.: WO2010/095670
PCT Pub. Date: Aug. 26, 2010

(65) Prior Publication Data
US 2011/0208942 A1      Aug. 25, 2011

(30) Foreign Application Priority Data

Feb. 17, 2009   (JP) ................................. 2009-033900

(51) Int. Cl.
*G06F 13/00* (2006.01)
*G06F 13/38* (2006.01)

(52) U.S. Cl.
CPC .................................... *G06F 13/385* (2013.01)

(58) Field of Classification Search
None
See application file for complete search history.

(56) References Cited

U.S. PATENT DOCUMENTS

2002/0002676 A1 *  1/2002  Kawasaki ........... G06F 11/1004
                                                            713/161
2007/0079062 A1    4/2007  Miyawaki et al.
2007/0283075 A1 * 12/2007  Patton ........................... 710/315
(Continued)

FOREIGN PATENT DOCUMENTS

JP        2005-092523 A    4/2005
JP          2007-65945 A    3/2007
(Continued)

OTHER PUBLICATIONS

Agere et al., "Wireless Universal Serial Bus Specification", Revision 1.0, May 12, 2005, p. 22.*

(Continued)

*Primary Examiner* — Sean D Rossiter
(74) *Attorney, Agent, or Firm* — Rossi, Kimms, & McDowell LLP

(57) ABSTRACT

An information processing apparatus able to normally unmount a memory and disconnect communication with a first external apparatus when receiving a processing request from a second external apparatus in a state that the first external apparatus mounts the memory connected to the apparatus. A multi-function peripheral as the processing apparatus (20) includes a controller OS. When receiving a processing request from a second host PC (10B) as the second external apparatus in a state where the multi-function peripheral is in communication with a first host PC (10A) as the first external apparatus (S3100), the controller OS requests the first host PC to unmount the memory (S3201), if the memory is mounted thereon. When receiving an unmount instruction from the first host PC (S3004), the controller OS unmounts the memory, disconnects the connection with the first host PC (S3005), and starts communication with the second host PC (S3101).

10 Claims, 16 Drawing Sheets

(56) References Cited

U.S. PATENT DOCUMENTS

| | | | |
|---|---|---|---|
| 2008/0301351 A1* | 12/2008 | Lee | 710/313 |
| 2009/0100281 A1* | 4/2009 | Watanabe et al. | 713/323 |
| 2009/0193155 A1* | 7/2009 | Skillman et al. | 710/14 |
| 2009/0193517 A1* | 7/2009 | Machiyama | G06F 21/608 726/18 |
| 2010/0262734 A1* | 10/2010 | Sohn et al. | 710/107 |
| 2012/0131295 A1* | 5/2012 | Nakajima | G06F 11/1456 711/162 |
| 2012/0190406 A1* | 7/2012 | Chen | G06F 1/1632 455/557 |

FOREIGN PATENT DOCUMENTS

| | | | |
|---|---|---|---|
| JP | 2007-102463 A | 4/2007 | |
| JP | 2007-251851 A | 9/2007 | |
| JP | 2008-052318 A | 3/2008 | |
| JP | 2008-118275 A | 5/2008 | |

OTHER PUBLICATIONS

International Search Report issued in corresponding PCT/JP2010/052391, mailed May 18, 2010.

Written Opinion issued in corresponding PCT/JP2010/052391, mailed May 18, 2010.

Japanese Office Action for corresponding JP 2009-033900, dated Sep. 10, 2013.

* cited by examiner

INFORMATION PROCESSING APPARATUS, CONTROL METHOD THEREOF, AND STORAGE MEDIUM

This application is a U.S. National Phase Application of PCT International Application PCT/JP2010/052391 filed on Feb. 10, 2010, which is based on and claims priority from Japanese Patent Application No. 2009-033900 filed on Feb. 17, 2009, the contents of which is incorporated herein by reference in its entirety.

TECHNICAL FIELD

The present invention relates to an information processing apparatus capable of communicating with a plurality of external apparatuses, a control method thereof, and a storage medium storing a program for executing the control method.

BACKGROUND ART

As a communication system for connecting a host computer with a device (such as a printer, a scanner, a digital camera, or the like), wireless USB is known. A single device can be shared between a plurality of host computers through wireless USB.

With wireless USB communication, however, the single device is unable to simultaneously communicate with the host computers. Therefore, it performs one-to-one communication with each of the host computers, as stipulated in wireless USB standard (Wireless USB Specification Rev. 1.0).

In the following, a process for establishing communication connection between a host computer and a device is described with reference to FIG. 12 for an exemplar case where a digital multi-function peripheral is used as the device. It should be noted that the digital multi-function peripheral (MFP) is an apparatus having plural functions (such as copying function, printing function, scanning function, facsimile function, and memory card read/write function) andused to accomplish efficient office work.

FIG. 12 is a view for explaining a process for establishing communication connection through wireless USB. In the illustrated system, wireless USB communication is performed between a host PC 1000 having a wireless USB antenna 1001 and a device 2000 having a wireless USB antenna 2001.

The host PC 1000 has a function of transmitting a beacon via the wireless USB antenna 1001. As shown in FIG. 13, a host
ID 1002 unique to the host PC 1000 and a device ID 2002 unique to the device 2000 are indicated in the beacon.

To request the device 2000 to execute a print job created by an application running on the host PC 1000, the host PC 1000 transmits a beacon to the device 2000. The device 2000 that receives the beacon reads a device ID 2002 indicated in the beacon, and confirms whether the device ID 2002 is the same as its own device ID. If the device ID 2002 differs from the own device ID, the device 2000 determines that the beacon is not directed to the device 2000 and discards the beacon.

Next, the device 2000 reads the host ID 1002 indicated in the beacon, and confirms in terms of association whether the host ID 1002 is equal to one of host IDs registered in the device 2000. If no such host ID is registered, the device discards the beacon, determining that no association has been set for the host PC. It should be noted that association is an initial connection process performed at the time of installation of wireless USB equipment in order that a CC (Connection Context) comprised of a host ID, a device ID, and a connection key is shared between a host PC and a device, and has three phases: identification, authentication, and authorization.

Next, the device 2000 transmits a connection request to the host PC 1000. When authorizing the connection request, the host PC 1000 transmits spooled print data to the device 2000. After completion of print data transmission, the host PC disconnects communication so as not to appropriate the device 2000. At that time, a disconnection request can be transmitted either from the host PC or from the device. As described above, one-to-one wireless USB communication connection is established.

On the other hand, in a case where a single device is shared between a plurality of host PCs, communication connection is established by listing host information in the order in which the device receives beacons from the host PCs and by sequentially transmitting connection requests to the host PCs based on the list. Thus, communication connection between the device and a sequentially selected one of the host PCs is established.

With reference to FIGS. 14 to 16, a description is given of a concrete system where a single device is shared between two host PCs. In FIG. 14, there is shown a case where first and second print jobs are respectively transmitted from first and second host PCs 1000, 1100 to the device 2000. A process sequence is shown in FIG. 15, and an example of host list is shown in FIG. 16.

The first host PC 1000 transmits to the device 2000 a first beacon 1000a as a print job processing request (step S6000). The device receiving the beacon requests the first host PC to establish wireless communication connection (step S6001). The first host PC establishes wireless communication connection with the device and then transmits print data for the first print job to the device (step S6002). After completion of processing on the print data by the device, the first host PC or the device requests disconnection of the wireless communication connection (step S6003).

The second host PC 1100 transmits to the device 2000 a second beacon 1100a as a print job processing request (step S6100). At that time, the device is in a state where wireless communication connection with the first host PC 1000 is established. Thus, after completion of processing on the first print job, the device disconnects wireless communication connection with the first host PC, and requests the second host PC to establish wireless communication connection (step S6101). The second host PC establishes wireless communication connection with the device, and then transmits print data for the second print job to the device (step S6102). After completion of processing on print data by the device, the second host PC or the device disconnects the wireless communication connection (step S6103).

The order in which the host PCs are connected is controlled based on a host list 1200 shown in FIG. 16. The host list 1200 is stored in a memory of the device 2000, and is comprised of a number field 1201 and a host name field 1202. The device registers into the host list 1200 host information in the order in which beacons from host PCs are received. In the number field 1201, there are shown the order in which connection requests are delivered as well as the order in which beacons are received.

It should be noted that the wireless USB communication system as described above is disclosed in, e.g., PTL (Patent Literature) 1 listed below.

Conventionally, file systemmount control (by which a memory is made accessible from a computer) has been known, in which a host PC establishes wireless communication connection with a device, and mounts as a file system a memory card attached to the device. In a digital camera and a digital multi-function peripheral, a construction has been realized where a host PC accesses a file stored in a memory card and reads the file from the memory card. A digital multi-function peripheral of this type has a memory card reader writer for reading and writing data from and into a memory card.

For example, in an information processing apparatus disclosed in PTL (Patent Literature) 2 listed below, data recording means is unmounted (or controlled to a state unaccessible from a computer) when it is determined that there is an apparatus connected to a device, but mounted again when it is determined that the connection between the device and the apparatus is disconnected. Thus, file system mount control can be made according to whether or not any apparatus is connected to the device.

With the above-described conventional arrangement where a digital multi-function peripheral (device) having a memory card reader writer is shared between a plurality of host PCs, the device is able to recognize completion of a print job requested from the device to the host PC, but a problem is posed that a memory card job by a host PC that mounts a memory of the device cannot be completed until the host PC unmounts a file system.

Unlike a print job, completion of a memory card job is controlled by the host PC having requested the memory card job. Thus, even when receiving a job request from another host PC, the device cannot immediately start communication with the other host PC. If the device forcibly disconnects communication with the host PC when the memory card job is being executed, the file system is forcibly dismounted from the host PC, and an error state of the host PC is caused, resulting in a fear that a file is destroyed in some cases.

If the memory card is left mounted even after a host PC user completes an operation for accessing the memory card of the device, a problem is posed that the device is appropriated solely by the one host PC.

CITATION LIST

Patent Literature

{PTL 1} Japanese Laid-open Patent No. 2007-251851
{PTL 2} Japanese Laid-open Patent No. 2007-65945

SUMMARY OF INVENTION

The present invention provides an information processing apparatus capable of normally unmounting a memory and disconnecting communication with a first external apparatus, when receiving a processing request from a second external apparatus in a state that the first external apparatus mounts the memory connected to the information processing apparatus, and provides a control method of the information processing apparatus and a storage medium storing a program for executing the control method.

Accordingly, a first aspect of this invention provides an information processing apparatus able to communicate with first and second external apparatuses, which comprises a connection unit configured to be connected to a data storage memory for communication with the memory, a judgment unit configured to determine whether the first external apparatus mounts the memory in a case where the information processing apparatus which is in communication with the first external apparatus receives a processing request from the second external apparatus, a request unit configured to request the first external apparatus to unmount the memory in a case where the judgment unit determines that the first external apparatus mounts the memory, and a communication control unit configured to disconnect communication with the first external apparatus and start communication with the second external apparatus after the first external apparatus unmounts the memory according to a request from the request unit.

Accordingly, a second aspect of this invention provides a control method of an information processing apparatus able to communicate with first and second external apparatuses and having a connection unit configured to be connected to a data storage memory for communication with the memory, which comprises a judgment step of determining whether the first external apparatus mounts the memory in a case where the information processing apparatus which is in communication with the first external apparatus receives a processing request from the second external apparatus, a request step of requesting the first external apparatus to unmount the memory in a case where it is determined in the judgment step that the first external apparatus mounts the memory, and a communication control step of disconnecting communication with the first external apparatus and starting communication with the second external apparatus after the first external apparatus unmounts the memory according to a request issued in the request step.

Accordingly, a third aspect of this invention provides a computer-readable storage medium storing a program for causing a computer to execute the control method according to the second aspect of this invention.

The features and advantages of the invention will become more apparent from the following detailed description taken in conjunction with the accompanying drawings.

ADVANTAGEOUS EFFECTS OF INVENTION

According to this invention, when a processing request is received from a second external apparatus in a state where a memory connected to the information processing apparatus is mounted on a first external apparatus, communication with the first external apparatus can be disconnected after the memory is normally unmounted. As a result, the information processing apparatus can be prevented from being unnecessarily appropriated by the first external apparatus, while avoiding occurrence of an error which would occur when communication is disconnected in a state that the memory is not normally unmounted.

DESCRIPTION OF EMBODIMENTS

In the following, one embodiment of this invention will be described with reference to the appended drawings.

In this embodiment, a description will be given of a system in which, in an environment of a single information processing apparatus being shared between a plurality of external apparatuses, each of the external apparatuses is able to mount, as a file system, a memory (e.g., a memory card) connected to the information processing apparatus.

First, the hardware construction of a digital multi-function peripheral as the information processing apparatus of this embodiment and the hardware construction of host PCs as external apparatuses are described with reference FIGS. 1 to 4.

Figure 1:
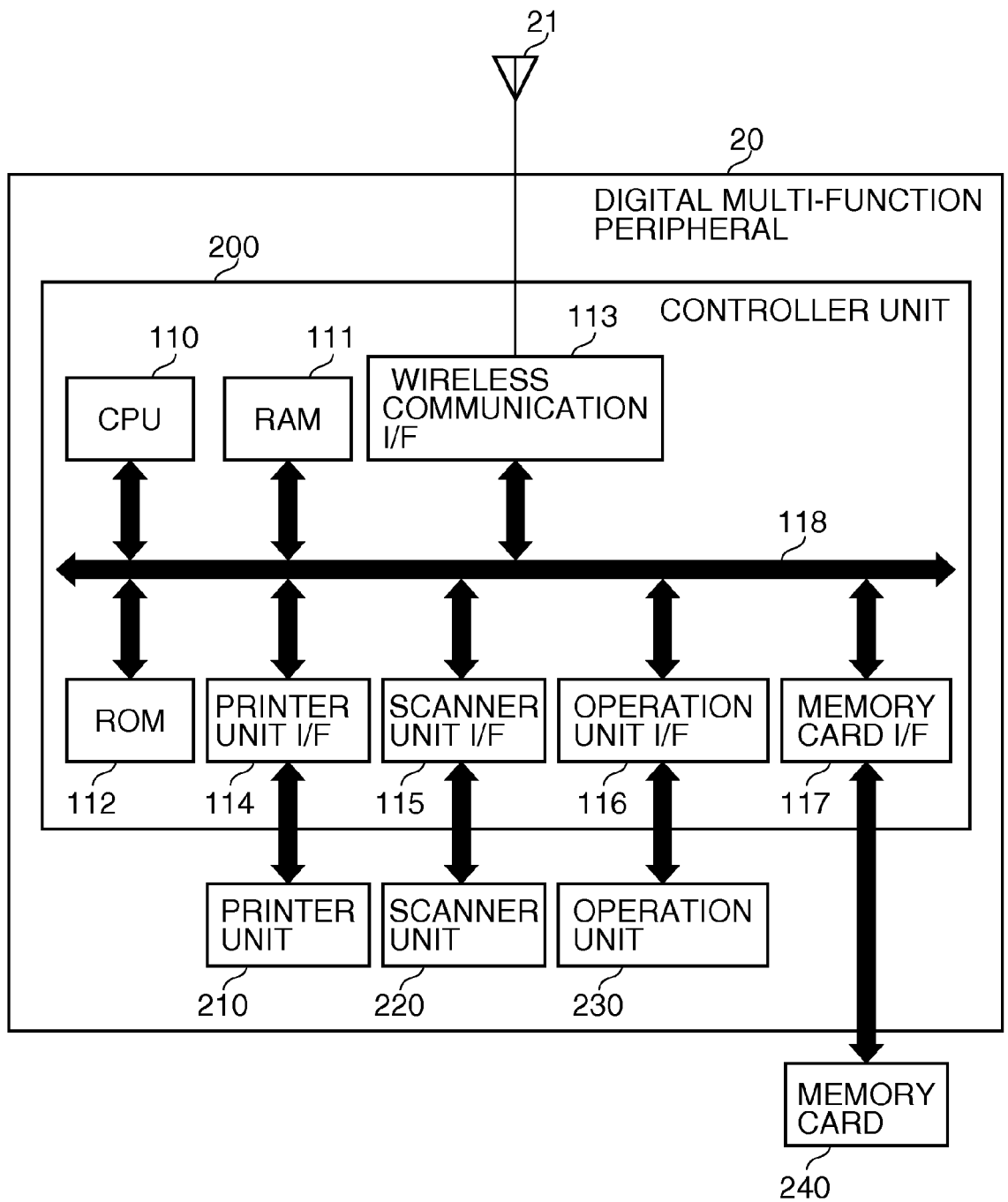
FIG. 1 is a block diagram showing the construction of a controller unit of a digital multi-function peripheral as an information processing apparatus according to one embodiment of this invention.

FIG. 1 shows in block diagram the construction of a controller unit of the digital multi-function peripheral.

As shown in FIG. 1, the digital multi-function peripheral (MFP) 20 includes a controller unit 200, a printer unit 210, a scanner unit 220, an operation unit 230, and a wireless USB antenna 21. The controller unit 200 includes a CPU 110, a RAM 111, a ROM 112, a wireless communication I/F 113, a printer unit I/F 114, and a scanner unit I/F 115. The controller unit 200 further includes an operation unit I/F 116, a memory card I/F 117, and an internal bus 118.

The printer unit 210 is an image output device for printing an image on a sheet. The scanner unit 220 is an image input device for reading an image from an original. The operation unit 230 includes an input device for performing various settings of the multi-function peripheral and giving an instruction to the multi-function peripheral, and includes a display device for providing various displays. The controller unit 200 for inputting and outputting image information and device information is connected to the printer unit 210, the scanner unit 220, and the operation unit 230. The controller unit 200 is connected to the host PCs for communication therewith through wireless communication via the wireless communication I/F 113 and the wireless USB antenna 21.

Figure 10:
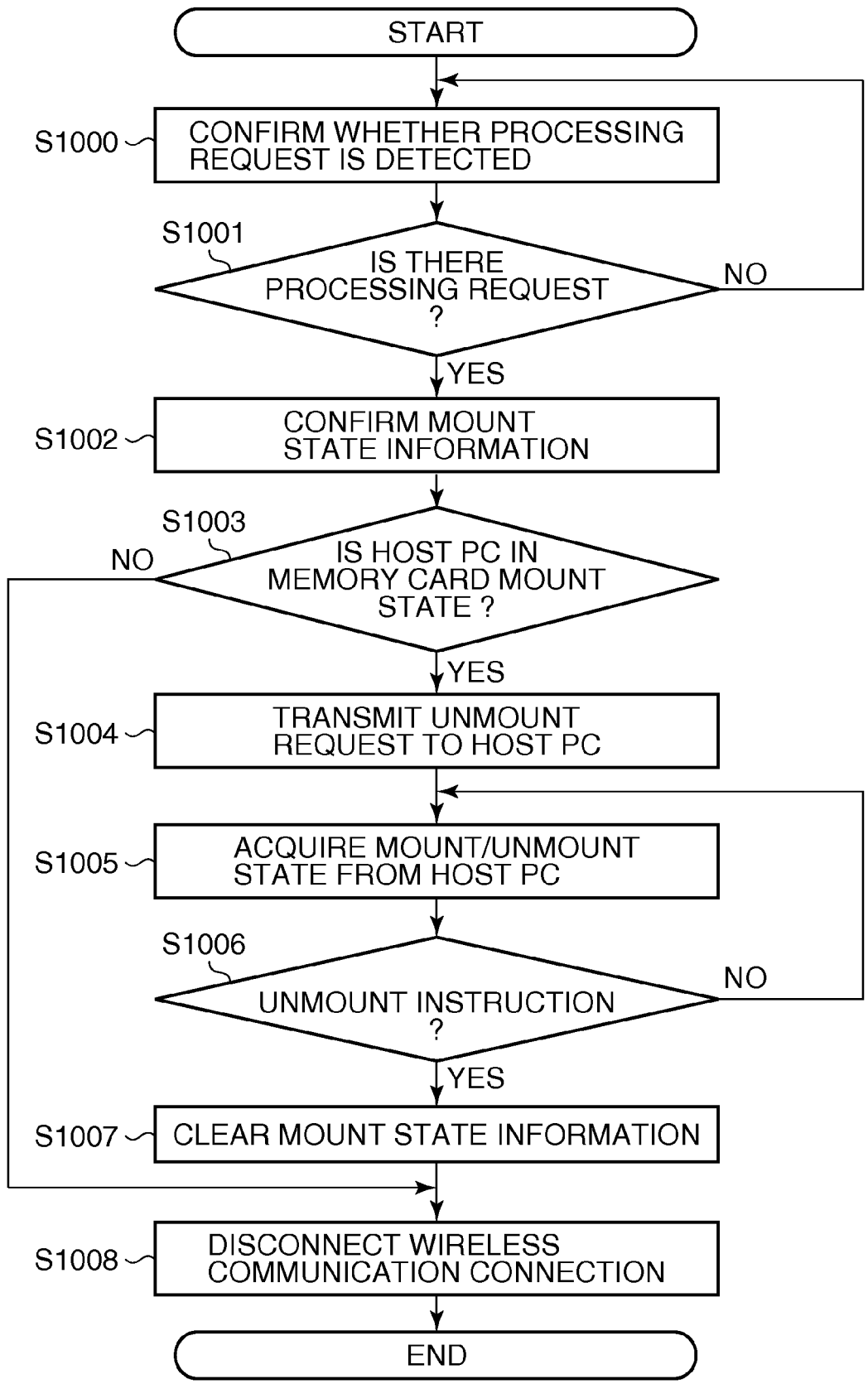
FIG. 10 is a flowchart showing a memory unmount process by the digital multi-function peripheral.

The CPU 110 for controlling the above-described parts via the internal bus 118 executes a process shown in flowchart of FIG. 10 based on a program of this invention. The RAM 111 is used as a system work memory for operation of the CPU 110 and as an image memory for temporarily storing image data. The ROM 112 stores a boot program, the program of this invention, a system application program, etc.

The printer unit I/F 114 is connected to the printer unit 210, communicates with a CPU (not shown) of the printer unit 210, and performs synchronous/asynchronous conversion of image data to be printed. The scanner unit I/F 115 is connected to the scanner unit 220, communicates with a CPU (not shown) of the scanner unit 220, and performs synchronous/asynchronous conversion of image data read from an original. The operation unit I/F 116 is an interface with the operation unit (user interface) 230. The operation unit I/F 116 outputs to the operation unit 230 image data to be displayed thereon, and supplies the operation unit 230 with information input by a user.

The wireless communication I/F 113 is connected via the wireless USB antenna 21 to the host PCs for communication therewith through wireless USB, and inputs and outputs image data to be printed and information for control of the multi-function peripheral. The memory card I/F 117 performs a process in which image data or the like is written into or read from the memory card 240.

The memory card 240 is for storing files of image data or the like. Image data read from an original by the scanner unit 220 can be written into the memory card, and image data to be printed by the printer unit 210 can be read from the memory card. Either one of the host PCs that is connected through wireless communication with the multi-function peripheral via the wireless USB antenna 21 and the wireless communication I/F 113 is able to mount the memory card 240 as a file system and able to perform a file operation. It should be noted that memory card 240 can be implemented by either a portable memory attached to and detached from the multi-function peripheral or a memory incorporated in the multi-function peripheral.

Figure 2:
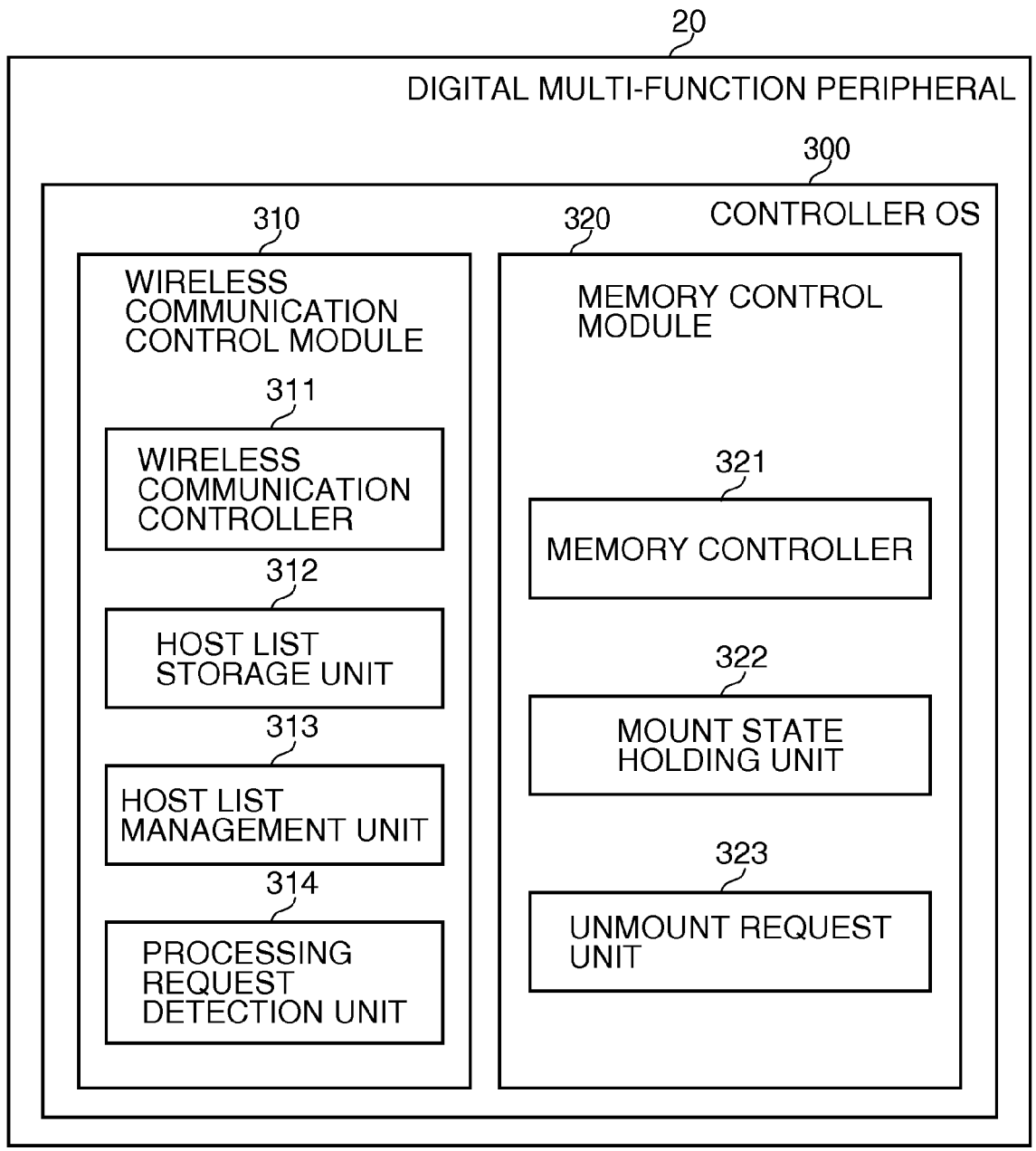
FIG. 2 is a block diagram showing the construction of a controller operating system of the digital multi-function peripheral.

FIG. 2 shows in block diagram the construction of a controller operating system (hereinafter referred to as the controller OS) of the digital multi-function peripheral.

As shown in FIG. 2, the controller OS 300 is comprised of a wireless communication control module 310 and a memory control module 320. The wireless communication control module 310 is comprised of a wireless communication controller 311, a host list storage unit 312, a host list management unit 313, and a processing request detection unit 314. The memory control module 320 is comprised of a memory controller 321, a mount state holding unit 322, and an unmount request unit 323. The controller OS 300 is executed by the CPU 110 of the digital multi-function peripheral 20, while using the RAM 111, for overall control of the multi-function peripheral 20 for image processing, print processing, scan processing, control processing for communication with the host PCs, etc.

Figure 16:
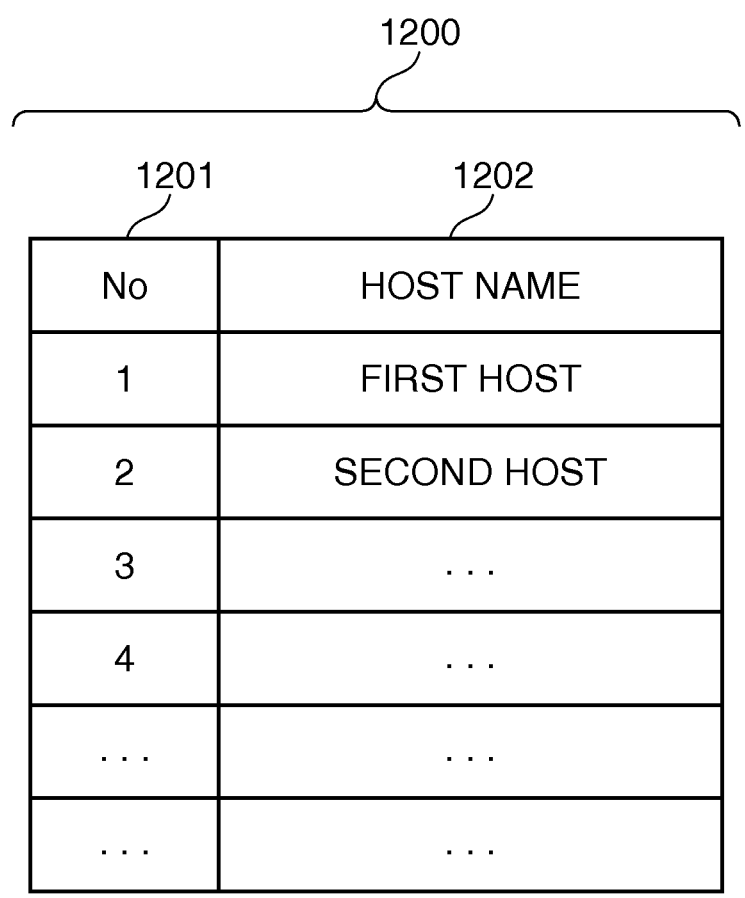
FIG. 16 is a view showing a host list stored in the device.

In the wireless communication control module 310, the wireless communication controller 311 hardware-controls the wireless communication I/F 113. The host list storage unit 312 stores a host list shown in FIG. 16. The host list management unit 313 performs a process for registration of host list. Specifically, when receiving a beacon from one of the host PCs, the host list management unit 313 adds a corresponding host name to the host list in the host list storage unit 312. When wireless communication connection with the host PC is disconnected, the host list management unit 313 erases first host information (identification information) in the host list, which corresponds to the disconnected host PC, and moves second host information and subsequent host information (identification information) forward on the host list.

The processing request detection unit 314 detects, referring to the host list, a processing request from any host PC other than a host PC currently connected. The processing request detection unit 314 compares the first host information with the second host information in the host list stored in the host list storage unit 312, and determines that the detection unit 314 receives a processing request from another host PC, if the first host information and the second host information are different from each other.

In the memory control module 320, the memory controller 321 hardware-controls the memory card I/F 117. The mount state holding unit 322 holds information representing a mount state of the memory card 240 on a host PC. The unmount request unit 323 requests a host PC to unmount the memory card 240 from file system.

Figure 3:
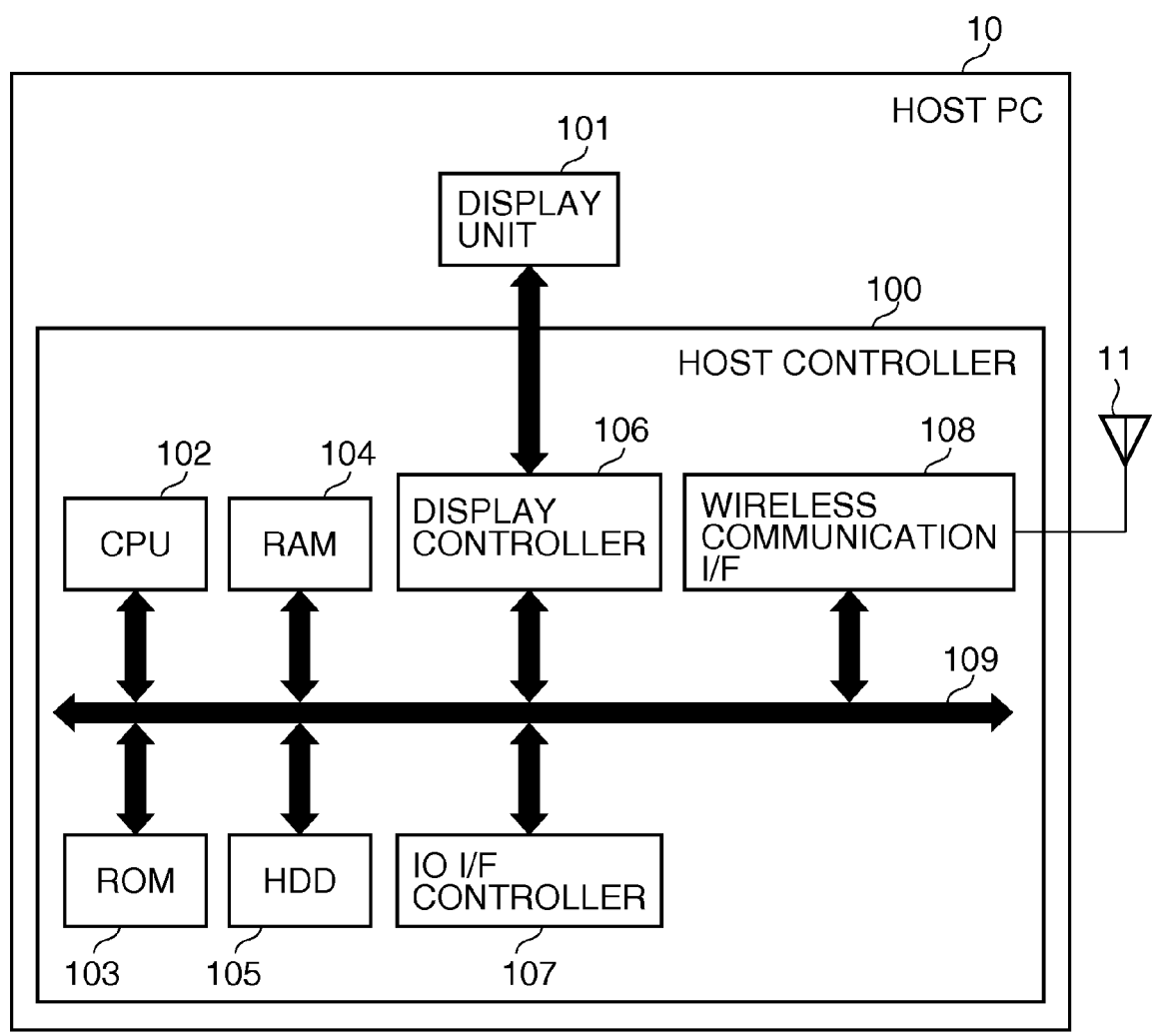
FIG. 3 is a block diagram showing the construction of a host controller of each of host PCs as external apparatuses adapted to be connected to the digital multi-function peripheral.

FIG. 3 shows in block diagram the construction of the host controller of each host PC.

As shown in FIG. 3, each host PC 10 includes a host controller 100, a display unit 101, a wireless USB antenna 11, a keyboard (not shown), and a mouse (not shown). The host controller 100 includes a CPU 102, a ROM 103, a RAM 104, a HDD (hard disk drive) 105, and a display controller 106. The host controller 100 further includes an IO (input/output) I/F controller 107, a wireless communication I/F 108, and a system bus 109.

The host controller 100 is connected to the display unit 101, the keyboard, and the mouse, and performs wireless USB communication control via the wireless USB antenna 11. The CPU 102 controls the above-described parts via the system bus 109, performs overall control of various processing performed in the host controller, and executes a process shown in flowchart of FIG. 11 based on a program of this invention. The ROM 103 stores a boot program and the program of this invention. The RAM 104 is used as a system work memory for operation of the CPU 102.

The HDD 105 stores system software and image data. The display controller 106 outputs to the display unit 101 image data to be displayed thereon. The IO I/F 107 is an interface with the keyboard and the mouse for data input and output, and performs control of wiredUSB or the like. The IO I/F 107 controls communication with a communication network such as LAN. The wireless communication I/F 108 controls wireless USB communication via the wireless USB antenna 11 in a case where there is a device for wireless USB communication (in this embodiment, digital multi-function peripheral), which is disposed externally of the host PC.

Figure 4:
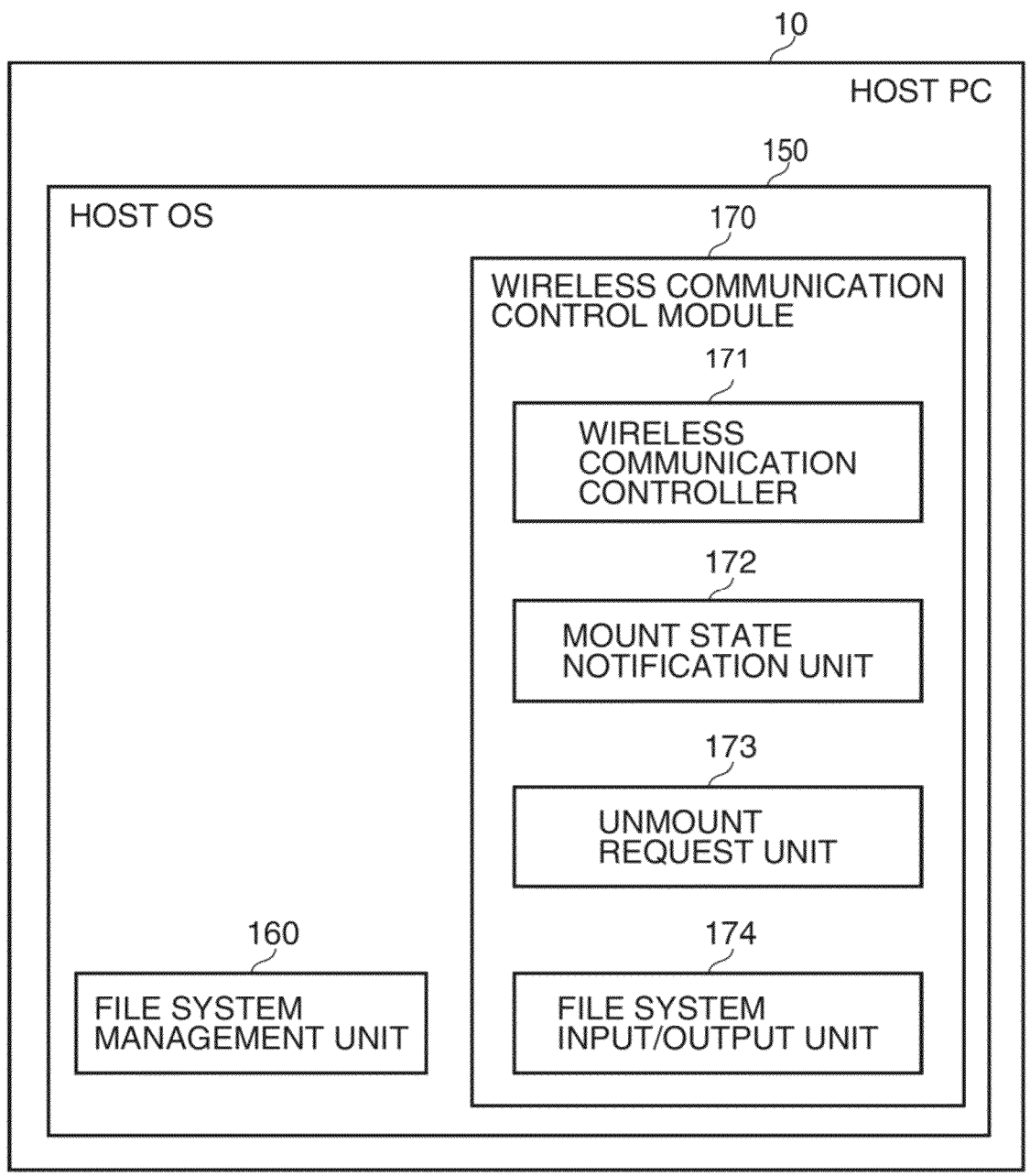
FIG. 4 is a block diagram showing the construction of a host operating system of each host PC.

FIG. 4 shows in block diagram the construction of a host OS of each host PC.

As shown in FIG. 4, the host OS 150 of the host PC 10 is comprised of a file system management unit 160 and a wireless communication control module 170. The control module 170 is comprised of a wireless communication controller 171, a mount state notification unit 172, an unmount request unit 173, and a file system input/output unit 174. The host OS 150 is executed by the CPU 102 of the host PC 10 for overall control of the host PC, while using the ROM 103, the RAM 104, and the HDD 105.

The file system management unit 160 for managing a file system of the host PC not only manages the internal HDD 105, but also manages an externally connected storage device as file system. In this embodiment, it is assumed that the management unit 160 manages the memory card 240 of the digital multi-function peripheral in a case where the memory card is used as file system.

In the wireless communication control module 170, the wireless communication controller 171 hardware-controls the wireless communication I/F 108. The mount state notification unit 172 notifies the digital multi-function peripheral of a mount state of file system. The unmount request unit 173 issues a file system unmount request to the file system management unit 160. The file system input/output unit 174 transfers file data between the digital multi-function peripheral and the file system management unit 160.

Next, operations of the digital multi-function peripheral of this embodiment and the host PCs, which are constructed as described above, will be described in detail with reference to FIGS. 5 to 11.

Figure 5:
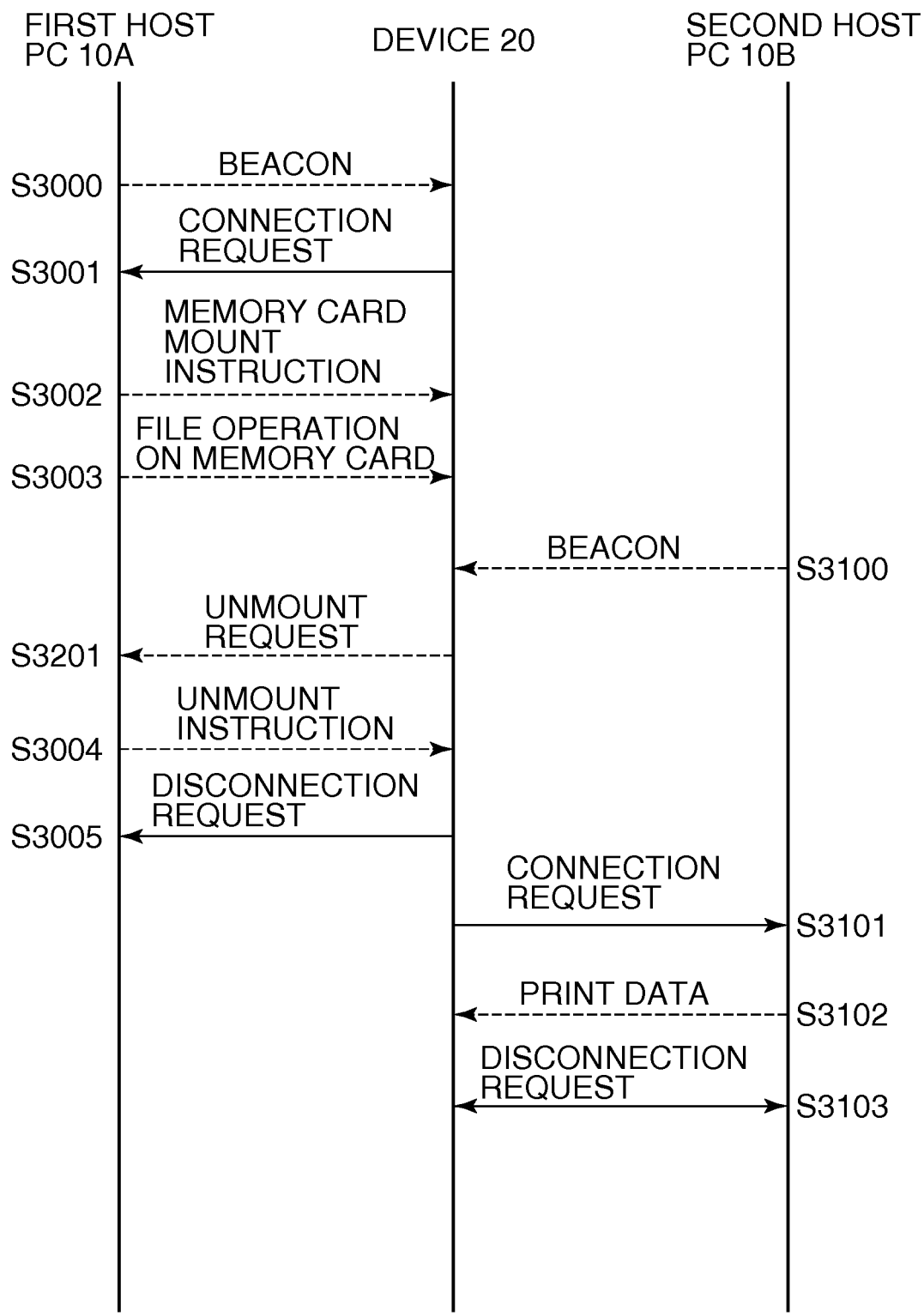
FIG. 5 is a sequence diagram showing the procedures of a memory file mount/unmount process performed by the digital multi-function peripheral and host PCs.

FIG. 5 shows in sequence diagram the procedures of a memory file mount/unmount process performed by the digital multi-function peripheral and host PCs.

With reference to FIG. 5, a description is given for a case where the digital multi-function peripheral (device) 20 having the memory card I/F 117 is shared between a plurality of host PCs (here, first and second host PCs (first and second external apparatuses)).

First, the first host PC (denoted by reference numeral 10A in FIG. 5) transmits a beacon as a job processing request to the device 20 (step S3000). When receiving the beacon, the device transmits a connection request to the first host PC (step S3001). The first host PC establishes wireless communication connection with the device, and transmits a memory card mount instruction to the device (step S3002). Subsequently, the first host PC operates a file on the memory card 240 according to a user's instruction (step S3003).

When receiving a beacon as a job processing request from the second host PC (denoted by reference numeral 10B in FIG. 5) before processing for unmounting the memory card 240 is executed in S3004 by the first host PC (step S3100), the device requests the currently connected first host PC to unmount the memory card 240 (step S3201).

When receiving the unmount request, the first host PC confirms a state of file system, and if the file system is in an unmountable state, instructs to unmount the memory card 240 (step S3004). More specifically, the first host PC determines, e.g., whether any file in the memory card 240 is being executed. If no file is being executed, the first host PC determines that the file system is in an unmountable state, and instructs the device to unmount the memory card 240. Thus, the device is able to unmount the memory card and then request the first host PC to disconnect the communication connection, whereby the file system is prevented from entering an error state (step S3005). Subsequently, the device transmits a connection request to the second host PC (step S3101), receives print data from the second host PC (step S3102) to perform a print job, and then requests the second host PC to disconnect communication connection (step S3103).

Figure 6:
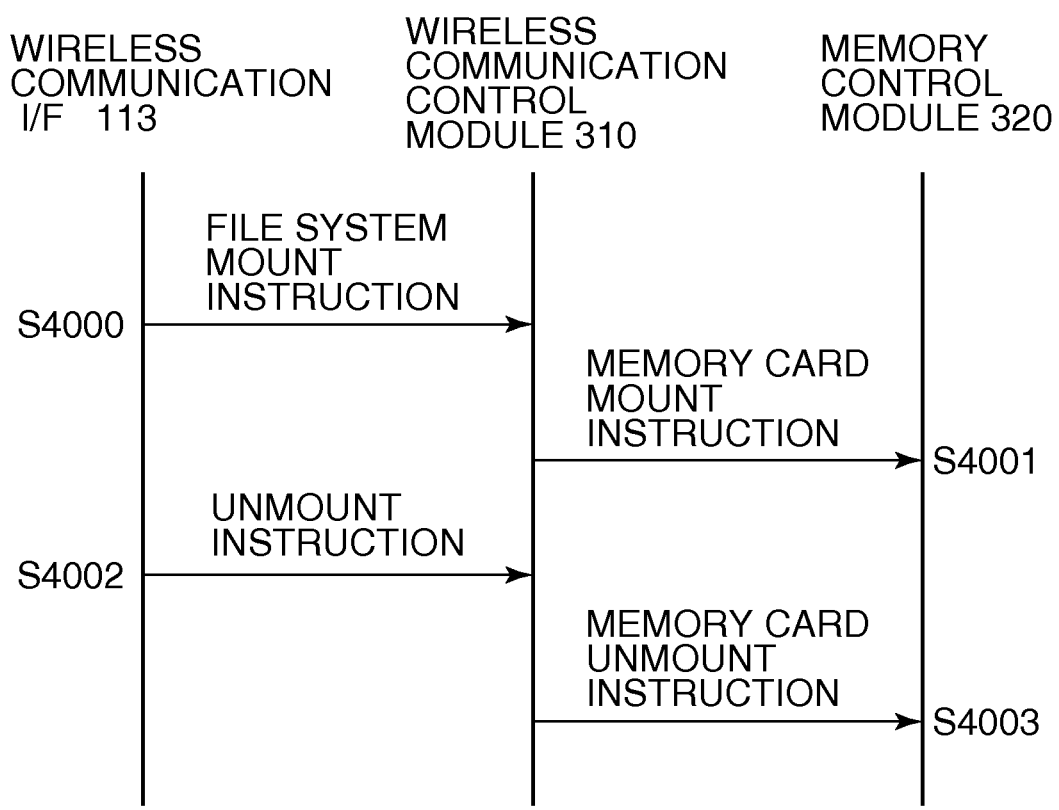
FIG. 6 is a sequence diagram showing the procedures of memory card mount/unmount control by the digital multi-function peripheral.

FIG. 6 shows in sequence diagram the procedures of memory card mount/unmount control performed by the digital multi-function peripheral.

With reference to FIG. 6, a description is given of processing performed by the wireless communication I/F 113 and wireless communication control module 310 of the digital multi-function peripheral 20. It should be noted that this processing is internal processing performed in the multi-function peripheral according to the memory file mount instruction (step S3002) and the memory file unmount instruction (step S3004), which are already described referring to FIG. 5.

When receiving a file system mount instruction from a host PC via the wireless communication I/F 113 (step S4000), the wireless communication control module 310 of the multi-function peripheral 20 notifies the memory control module 320 of a memory card mount instruction (step S4001). The memory controller 321 of the control module 320 mounts the memory card, and the mount state holding unit 322 holds information representing a memory mount state.

When receiving an unmount instruction from a host PC via the wireless communication I/F 113 (step S4002), the wireless communication control module 310 of the multi-function peripheral notifies the memory control module 320 of a memory card unmount instruction (step S4003). The memory controller 321 of the memory control module 320 unmounts the memory card, and the mount state holding unit 322 holds information representing a memory unmount state.

Figure 7:
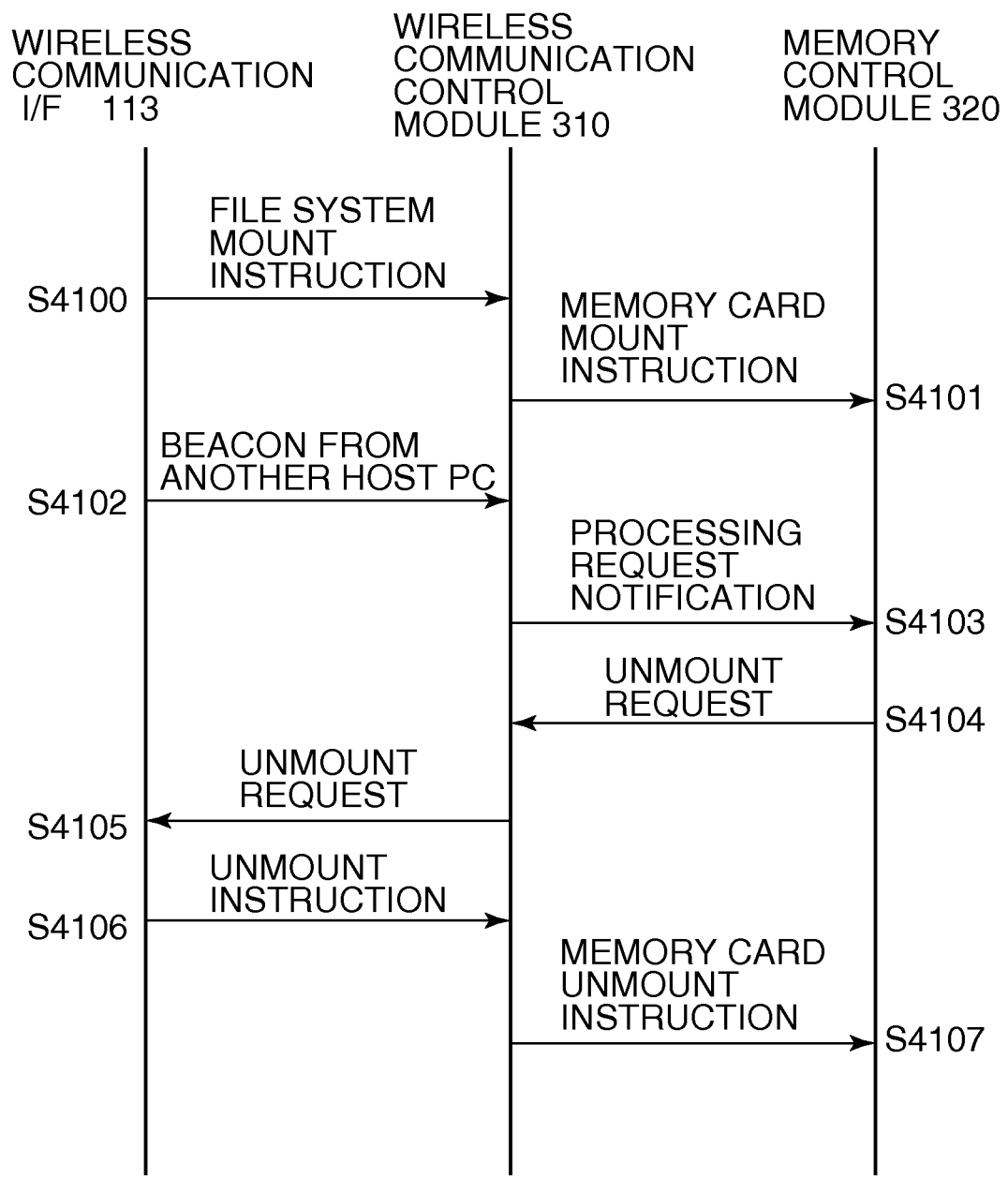
FIG. 7 is a sequence diagram showing another procedures of the memory card mount/unmount control by the digital multi-function peripheral.

FIG. 7 shows in sequence diagram another procedures of memory card mount/unmount control performed by the digital multi-function peripheral.

With reference to FIG. 7, a description is given of processing performed by the wireless communication I/F 113 and the wireless communication control module 310.

In steps S4100 and S4101 in FIG. 7, the same processing as that in steps S4000 and S4001 in FIG. 6 is performed according to a mount instruction from a host PC, whereby the memory card is mounted. When the wireless communication control module 310 of the digital multi-function peripheral 20 receives a beacon from another host PC via the wireless communication I/F 113 (step S4102), the processing request detection unit 314 of the control module 310 detects a processing request from the other host PC. The control module 310 notifies the memory control module 320 that the processing request is received from the other host PC (step S4103).

In the memory control module 320, the mount state holding unit holds information representing a memory mount state, and the unmount request unit 323 issues an unmount request to the wireless communication control module 310 (step S4104). In response to this, the wireless communication controller 311 of the wireless communication control module 310 transmits an unmount request to the host PC via the wireless communication I/F 113 (step S4105).

In S4106 and S4107, processing corresponding to S4002 and S4003 in FIG. 6 is executed, whereby the memory card is unmounted.

Figure 8:
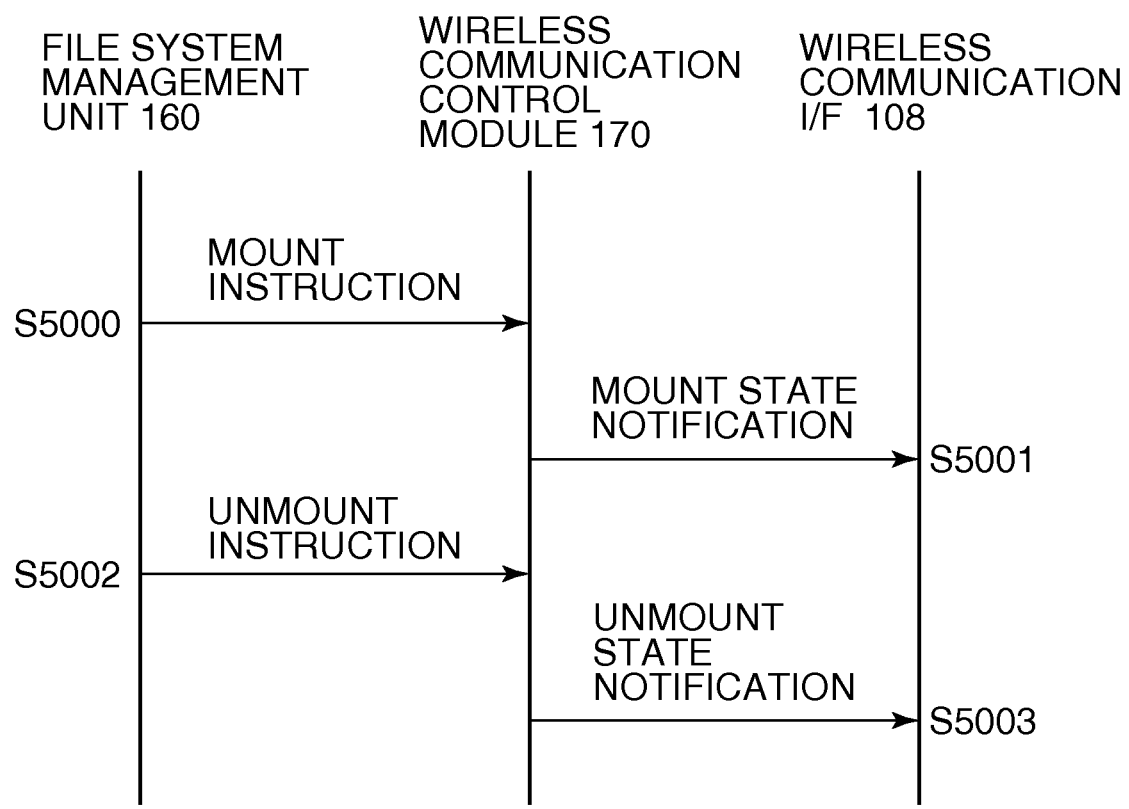
FIG. 8 is a sequence diagram showing the procedures of memory card mount/unmount control by each host PC.

FIG. 8 shows in sequence diagram the procedures of memory card mount/unmount control performed by each host PC.

With reference to FIG. 8, a description is given of processing performed by the wireless communication I/F 108, the wireless communication control module 170, and the file system management unit 160 of the host PC 10. It should be noted that this processing is internal processing performed by the host PC according to a memory file mount instruction (step S3002) and a memory file unmount instruction (step S3004), which are already described referring to FIG. 5.

When the wireless communication control module 170 is notified of a mount instruction from the file system management unit 160 (step S5000), the mount state notification unit 172 of the module 170 notifies the digital multi-function peripheral 20 of a file system mount state via the wireless communication controller 171 and the wireless communication I/F 108 (step S5001).

When the wireless communication control module 170 is notified of an unmount instruction from the file system management unit 160 (step S5002), the mount state notification unit 172 of the module 170 notifies the multi-function peripheral of a file system unmount state via the wireless communication controller 171 and the wireless communication I/F 108 (step S5003).

Figure 9:
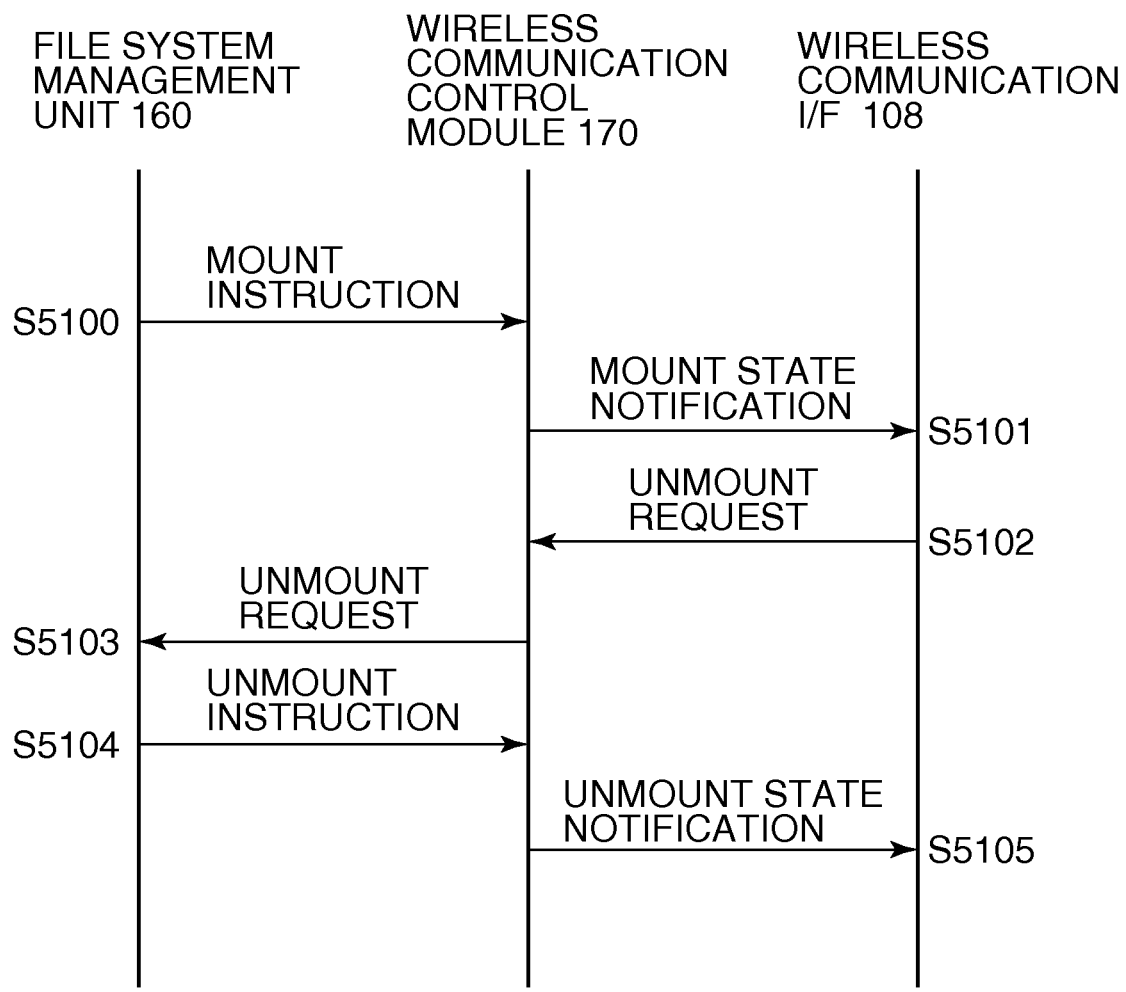
FIG. 9 is a sequence diagram showing another procedures of the memory card mount/unmount control by each host PC.

FIG. 9 shows in sequence diagram another procedures of the memory card mount/unmount control by each host PC.

With reference to FIG. 9, a description is given of the processing performed by the wireless communication I/F 108, the wireless communication control module 170, and the file system management unit 160.

In S5100 and S5101, the same processing as that in S5000 and S5001 in FIG. 8 is executed, so that a file system mount state is notified from the host PC 10 to the digital multi-function peripheral 20. Subsequently, when the wireless communication controller 171 of the wireless communication control module 170 of the host PC receives an unmount request from the multi-function peripheral via the wireless communication I/F 108 (step S5102), the unmount request unit 173 of the module 170 transmits a file system unmount request to the file system management unit 160 (step S5103). In response to this, the management unit 160 shifts the file system to an unmount state.

When the file system is put into an unmount state, the file system management unit 160 issues a file system unmount instruction (step S5104). In response to this, the mount state notification unit 172 notifies the multi-function peripheral of a file system unmount state via the wireless communication controller 171 and the wireless communication I/F 108 (step S5105).

FIG. 10 shows in flowchart a memory unmount process performed by the digital multi-function peripheral. The memory unmount process is internal processing performed in steps S4103 to S4107 in FIG. 7 by the controller OS 300 of the multi-function peripheral under the control of the CPU 110 of the multi-function peripheral.

In FIG. 10, it is assumed that the multi-function peripheral is in a state where it communicates with the first host PC. The controller OS 300 of the multi-function peripheral confirms whether a processing request from a new host PC (second host PC) to the multi-function peripheral is detected by the processing request detection unit 314 (step S1000).

Next, the controller OS 300 determines based on the detection state confirmed in step S1000 whether there is a processing request (step S1001). If there is no processing request from the new host PC, the flow returns to step S1000. If there is a processing request from the new host PC, the controller OS 300 confirms information held in the mount state holding unit 322 and representing a memory mount state (step S1002).

Next, the controller OS 300 determines based on the information confirmed in step S1002 whether the host PC is in a state mounted with the memory card 240 (step S1003). If the host PC is not in a state mounted with the memory card 240, the flow proceeds to step S1008. If the host PC is in a state mounted with the memory card 240, the controller OS 300 causes the unmount request unit 323 to transmit an unmount request to the host PC via the wireless communication I/F 113 (step S1004).

Next, the controller OS 300 acquires a mount/unmount state notified from the first host PC in step S2005 in FIG. 11, described later (step S1005). Then, the controller OS 300 determines whether the acquired mount/unmount state represents an unmount instruction given from the first host PC (step S1006). If the acquired state does not represent an unmount instruction from the first host PC, the flow returns to step S1005. If the acquired state represents an unmount instruction from the first host PC, the controller OS 300 clears the information held in the mount state holding unit 322 and representing a memory card mount state of the first host PC (step S1007).

Then, the controller OS 300 holds information representing a state where the first host PC does not mount the memory card 240. Next, the controller OS 300 causes the wireless communication controller 311 to disconnect wireless communication connection with the first host PC (step S1008), whereupon the present process is completed. Subsequently, the controller OS starts wireless communication connection with a new host PC (second host PC).

Figure 11:
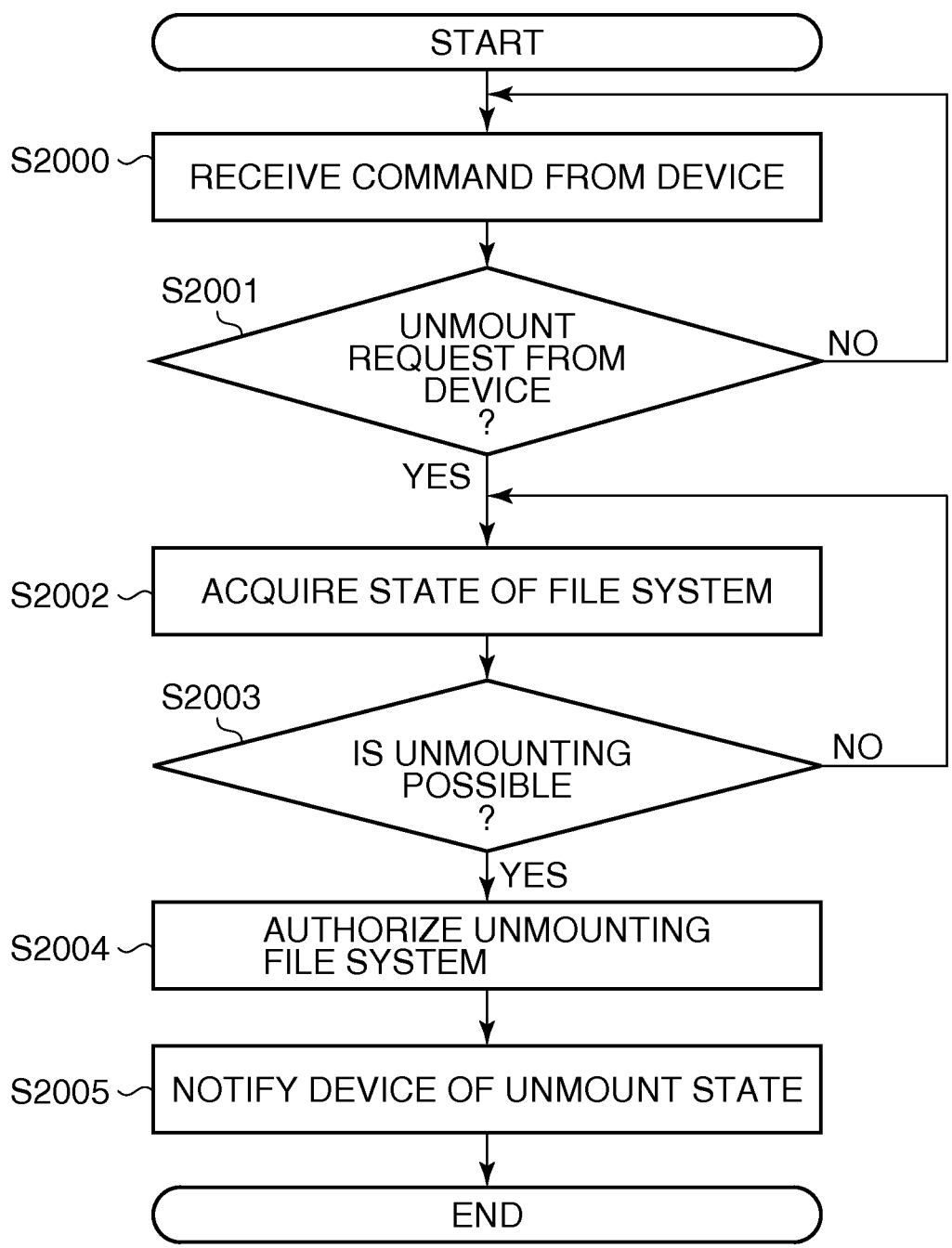
FIG. 11 is a flowchart showing a memory unmount process by each host PC.
Figure 12:
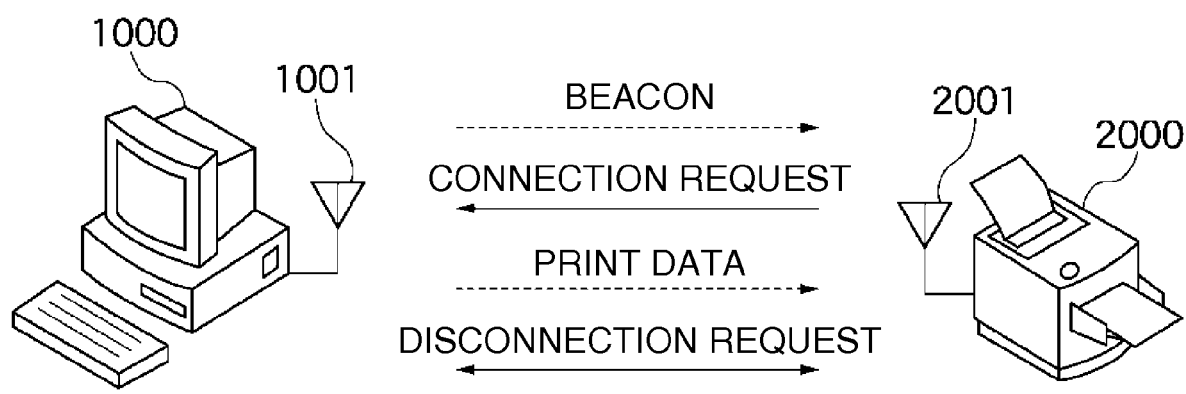
FIG. 12 is a view showing the procedures for establishing wireless USB communication connection.
Figure 13:
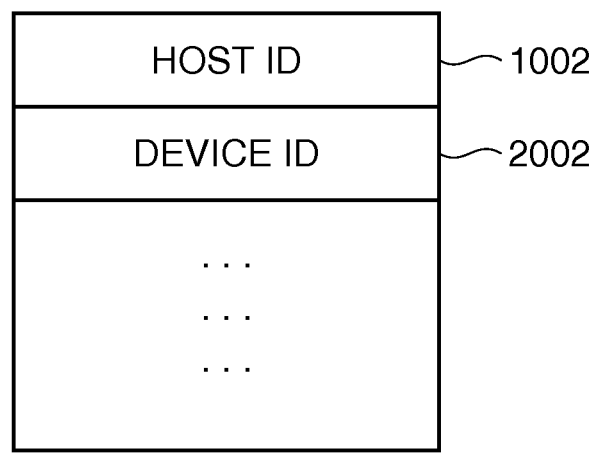
FIG. 13 is a view showing a beacon containing a host ID and a device ID.
Figure 14:
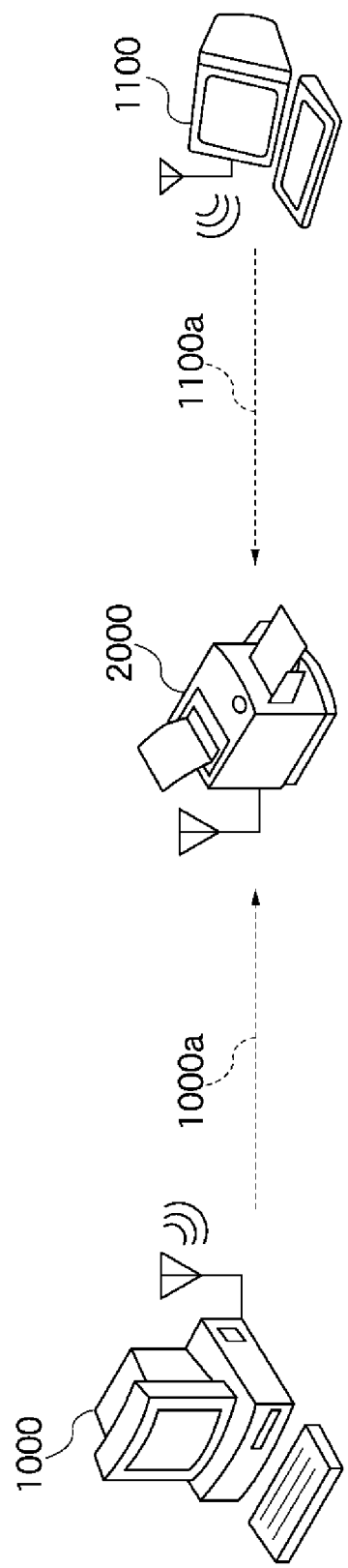
FIG. 14 is a view showing a system comprised of a plurality of host PCs and a single device.
Figure 15:
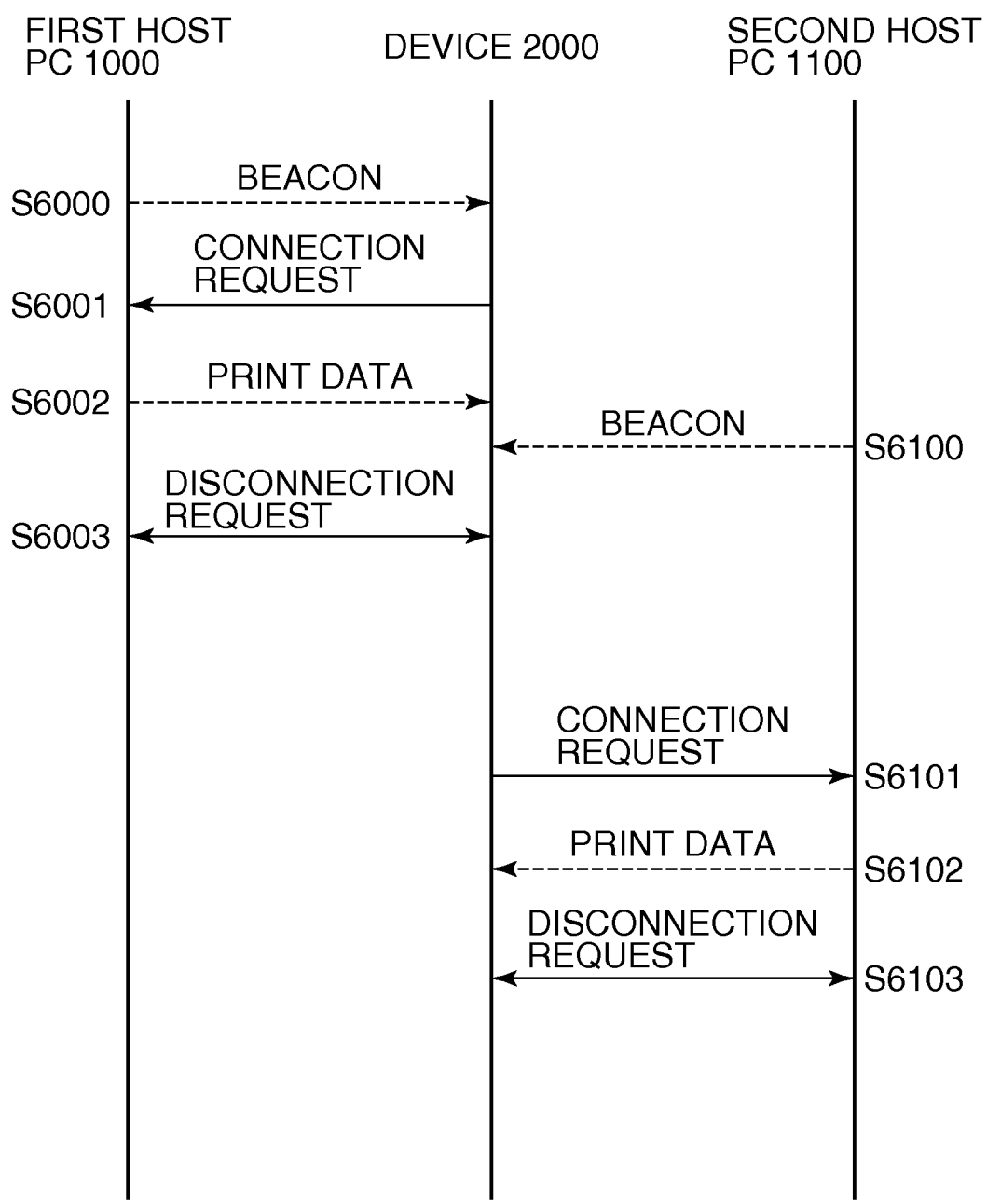
FIG. 15 is a sequence diagram showing a process for enabling the host PCs to share the single device.

FIG. 11 is a flowchart showing a memory unmount process performed by each host PC. This process is internal processing performed by the host PC in steps S5102 to S5105 in FIG. 9 under the control of the CPU 102 of the host PC.

Referring to FIG. 11, the host OS 150 of the host PC receives at the wireless communication controller 171 a command transmitted from the digital multi-function peripheral via the wireless communication I/F 108 (step S2000). Next, the host OS 150 determines whether the command received in step S2000 is an unmount request transmitted from the multi-function peripheral in step S1004 in FIG. 10 (step S2001). If the received command is not an unmount request from the multi-function peripheral, the flow returns to step S2000.

If the received command is an unmount request from the multi-function peripheral, the host OS 150 causes the unmount request unit 173 to acquire a state of file system from the file system management unit 160 (step S2002). Next, based on the state of file system acquired in step S2002, the host OS 150 determines whether unmounting the file system is possible (step S2003). If unmounting the file system is not possible, the flow returns to step S2002.

If unmounting the file system is possible, the file system input/output unit 174 of the host OS 150 issues a file system unmount authorization (step S2004). Next, the host OS 150 causes the mount state notification unit 172 to notify the digital multi-function peripheral of a file system unmount state via the wireless communication I/F 108 (step S2005), whereupon the present process is completed.

As described in detail above, according to this embodiment, it is determined whether the first host PC is in a state mounted with the memory card, when a processing request is received from the second host PC in a state that wireless communication is performed between the digital multi-function peripheral and the first host PC. If the first host PC is in a state mounted with the memory card, a request for unmounting the memory card is issued to the first host PC. When an unmount instruction is given from the first host PC, the memory card mount state of the first host PC is released and an unmount state is entered. Subsequently, the wireless communication connection with the first host PC is disconnected and wireless communication with the second host PC is started.

It is therefore possible to eliminate the prior art problem such that when a memory card job is being performed by a host PC, communication with another host PC cannot be started even if the digital multi-function peripheral receives a processing request from the other host PC. It is also possible to eliminate the prior art problem such that an error state is caused, if the digital multi-function peripheral forcibly disconnects communication with a host PC when a memory card job is being performed by the host PC. Thus, a communication disconnection process can be made without causing an error in the host PC. Also, the digital multi-function peripheral can be sharedbetween a plurality of host PCs, while preventing the multi-function peripheral from being appropriated by any one of the host PCs.

It should be noted that in the above description, a case has been described where memory unmounting is requested to a currently connected host PC when a processing request is received from another host PC, but this is not limitative. For example, an unmount process can be made by the device itself instead of the currently connected host PC, and communication with the currently connected host PC can be disconnected. In that case, it is more preferable that before disconnection of communication, the host PC be notified that the memory has been unmounted.

In the above description, a case has been described where a memory unmount request is issued to a currently connected host PC when a processing request is received from another host PC, but this is not limitative. Specifically, a memory unmount request can be issued at a timing other than a timing of reception of a processing request from another host PC. For example, in a case where the device reads out data in a memory according to an instruction from a host PC to carry out a printing process, a memory unmount request can be issued to the host PC at completion of the printing process. A memory unmount request can be issued as a time-out process when no operation is performed on a file in the memory for a predetermined time period.

[Other Embodiments]

It is to be understood that the present invention may also be accomplished by supplying a system or an apparatus with a storage medium in which a program code of software, which realizes the functions of the above described embodiment is stored and by causing a computer (or CPU or MPU) of the system or apparatus to read out the program code stored in the storage medium.

In that case, the program code itself read from the storage medium realizes the functions of the above described embodiment, and therefore the program code and the storage medium in which the program code is stored constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

10 host PC
20 digital multi-function peripheral
100 host controller
108 wireless communication I/F
110 CPU
113 wireless communication I/F
150 host OS
160 file system management unit
170 wireless communication control module
200 controller unit
240 memory card
300 controller OS
310 wireless communication control module
320 memory control module

The invention claimed is:

1. An information processing apparatus able to communicate with first and second external apparatuses, comprising:
 a connection unit configured to communicate with an external portable memory;
 a judgment unit configured to determine whether the first external apparatus mounts the external portable memory in a case where the information processing apparatus which is in communication with the first external apparatus receives a processing request from the second external apparatus;
 a request unit configured to transmit an unmount request for unmounting the external portable memory to the first external apparatus in a case where said judgment unit determines that the first external apparatus mounts the external portable memory;

a receiving unit configured to receive an unmount instruction which is transmitted from the first external apparatus according to the unmount request transmitted by the request unit;

a processing unit configured to execute an unmount process for unmounting the external portable memory according to the unmount instruction received by the receiving unit; and a communication control unit configured to disconnect communication with the first external apparatus and start communication with the second external apparatus after the processing unit executes the unmount process.

2. The information processing apparatus according to claim 1, including:

a memory controller configured to mount or unmount the external portable memory according to an instruction from the first external apparatus.

3. The information processing apparatus according to claim 2, wherein said communication control unit disconnects the communication with the first external apparatus after said memory controller unmounts the external portable memory according to the instruction from the first external apparatus.

4. The information processing apparatus according to claim 1, wherein when said judgment unit determines that the first external apparatus does not mount the external portable memory, said communication control unit disconnects the communication with the first external apparatus, without said request unit transmitting the unmount request to the first external apparatus.

5. The information processing apparatus according to claim 1, including:

a communication unit configured to perform wireless communication with the first and second external apparatuses; and a management unit configured, in a case where it receives a processing request from either the first external apparatus or the second external apparatus via said communication unit, to manage identification information representing the external apparatus from which the processing request has been transmitted, wherein said communication control unit controls communication between said communication unit and the first and second external apparatuses based on the identification information managed by said management unit.

6. The information processing apparatus according to claim 5, wherein said communication unit performs wireless USB communication with the first and second external apparatuses.

7. The information processing apparatus according to claim 1, wherein said connection units performs a process for writing data into the external portable memory or a process for reading out data from the external portable memory according to an instruction from the first external apparatus in a state where the first external apparatus mounts the external portable memory.

8. The information processing apparatus according to claim 1, wherein the external portable memory is able to be attached to and detached from the information processing apparatus.

9. A control method of an information processing apparatus able to communicate with first and second external apparatuses and having a connection unit configured to communicate with an external portable memory, comprising:

a judgment step of determining whether the first external apparatus mounts the external portable memory in a case where the information processing apparatus which is in communication with the first external apparatus receives a processing request from the second external apparatus;

a request step of transmitting an unmount request for unmounting the external portable memory to the first external apparatus in a case where it is determined in said judgment step that the first external apparatus mounts the external portable memory;

a receiving step of receiving an unmount instruction which is transmitted from the first external apparatus according to the transmitted unmount request;

a processing step of executing an unmount process for unmounting the external portable memory according to the unmount instruction received in the receiving step; and a communication control step of disconnecting communication with the first external apparatus and starting communication with the second external apparatus after the unmount process is executed in the processing step.

10. A non-transitory computer-readable storage medium storing a program for causing a computer to execute a control method of an information processing apparatus able to communicate with first and second external apparatuses and having a connection unit configured to communicate with an external portable memory, the control method comprising:

a judgment step of determining whether the first external apparatus mounts the external portable memory in a case where the information processing apparatus which is in communication with the first external apparatus receives a processing request from the second external apparatus;

a request step of transmitting an unmount request for unmounting the external portable memory to the first external apparatus in a case where it is determined in said judgment step that the first external apparatus mounts the external portable memory; and a receiving step of receiving an unmount instruction which is transmitted from the first external apparatus according to the transmitted unmount request;

a processing step of executing an unmount process for unmounting the external portable memory according to the unmount instruction received in the receiving step; and a communication control step of disconnecting communication with the first external apparatus and starting communication with the second external apparatus after the unmount process is executed in the processing step.

\* \* \* \* \*